(12) United States Patent
Bauer

(10) Patent No.: US 6,542,345 B1
(45) Date of Patent: Apr. 1, 2003

(54) CIRCUIT BREAKER

(75) Inventor: Bernhard Bauer, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/674,842

(22) PCT Filed: May 3, 1999

(86) PCT No.: PCT/EP99/02994

§ 371 (c)(1),
(2), (4) Date: Jan. 3, 2001

(87) PCT Pub. No.: WO99/60681

PCT Pub. Date: Nov. 25, 1999

(30) Foreign Application Priority Data

May 14, 1998 (EP) .............................. 98108823

(51) Int. Cl.[7] ................................. H02H 3/00
(52) U.S. Cl. ............................ 361/94; 361/96
(58) Field of Search .................. 361/42, 83, 94, 361/89, 88, 95

(56) References Cited

U.S. PATENT DOCUMENTS

| | | | | |
|---|---|---|---|---|
| 4,266,259 A | * | 5/1981 | Howell | 361/97 |
| 4,571,659 A | * | 2/1986 | Demeyer et al. | 361/95 |
| 5,420,740 A | * | 5/1995 | MacKenzie et al. | 361/45 |
| 5,835,321 A | * | 11/1998 | Elms et al. | 361/45 |
| 6,128,169 A | * | 10/2000 | Neiger et al. | 361/42 |

FOREIGN PATENT DOCUMENTS

| | | |
|---|---|---|
| GB | 2258095 A | 1/1993 |
| JP | 06-133448 | 5/1994 |
| WO | WO 96/29770 | 9/1995 |

OTHER PUBLICATIONS

1/73, LM139/LM239/LM339—A Quad of Independently Functioning Comparators, in Linear Applications Handbook, National Semiconductor 1986, pp. 257–260.*
1988, MC14093B Data Sheet, in CMOS Logic Data; Motorola Inc., pp. 6–62–6–165.*
Reinhard Solleder, 1986 "Why fault–current circuit breaker with a tripping that is independent from main voltage?" Electrische Sicherheit etz Bd. 107 Heft 20, pp. 938–945.

* cited by examiner

*Primary Examiner*—Stephen W. Jackson
*Assistant Examiner*—Zeev Kitov
(74) *Attorney, Agent, or Firm*—Morrison & Foerster, LLP

(57) ABSTRACT

In order to provide a circuit breaker, in particular a residual-current circuit breaker or residual-current device, having a variable time delay, which firstly has a stable no-trip response to short-term fault currents and secondly has a particularly short tripping time both in the event of sinusoidal fault currents and in the event of non-sinusoidal fault currents, a delay circuit is provided which comprises two series-connected comparators with a time-delay module connected between them. In this case, there is a smoothing module upstream of the first comparator.

10 Claims, 4 Drawing Sheets

CIRCUIT BREAKER

FIELD OF THE INVENTION

Figure 1:
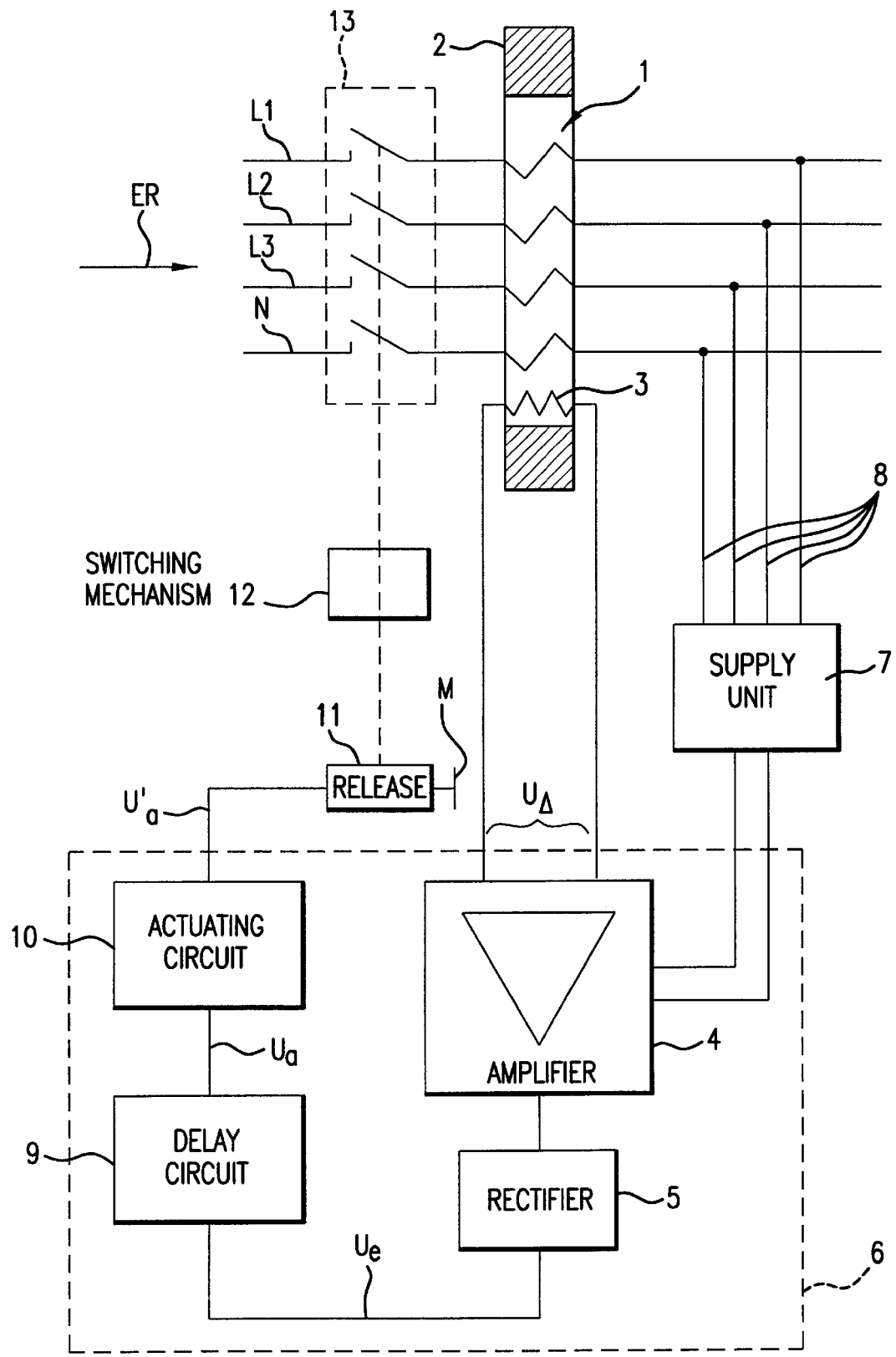

The invention relates to a circuit breaker, in particular to a residual-current circuit breaker or residual-current device, having a variable time delay.

Such a circuit breaker is used to ensure protection against a dangerous body current in an electrical system. Such a dangerous body current occurs, for example, when someone touches a live part of an electrical system. The fault current or residual current then flows to ground via the person, as a body current. The circuit breaker which is used for protection against dangerous body currents disconnects the relevant circuits from the power supply system safely and quickly when the so-called rated fault current is exceeded.

The construction of a circuit breaker is known, for example, from "etz" (1986), Issue 20, pages 938 to 945. Outline circuit diagrams and functional principles of a fault-current circuit breaker (FI circuit breaker) and a residual-current circuit breaker (RC circuit breaker) are illustrated there, in particular in FIGS. 1 to 3.

Fault-current circuit breakers and residual-current circuit breakers are constructed in a similar way from three assemblies. When a fault current occurs, a voltage signal is induced in the secondary winding of a core-balance transformer, through whose transformer core all the current-carrying conductors of a conductor network are passed, and this voltage signal actuates a release which is connected to the secondary winding via tripping circuit electronics. For its part, the release is coupled to a switching mechanism, via which the contacts of a power breaker connected in the line or in each line are opened when the release responds. In this case, the fault-current circuit breaker takes the energy required for tripping from the fault current itself, independently of the power supply system voltage, while, in a residual-current circuit breaker, tripping is carried out in a manner dependent on the power supply system voltage. To this end, the signal emitted from the core-balance transformer is supplied, when a fault current occurs, to the residual-current tripping circuit of the residual-current circuit breaker, or of the residual-current device, with this tripping circuit being supplied from the line network.

Such residual-current circuit breakers are often provided with a tripping time delay, which does not enable the actuation of the release when a fault current occurs until after a variable delay time. This prevents a brief fault current, arising from normal operation, leading to undesirable tripping of the circuit breaker, and thus the interference with the operating processes as a result of power supply system disconnection. Both the boundary conditions in which tripping of the circuit breaker must take place and the boundary conditions in which such a circuit breaker must not trip are specified, for example for residual-current devices in power breakers, in IEC Standard 947-2. Compliance with the said Standard is tested, on the one hand, by means of a no-trip test. In this case, a sinusoidal fault current of magnitude 2×IΔn (IΔn=rated fault current) and with a length equal to the delay time set is produced. In this case, the circuit breaker being tested must not trip. On the other hand, a tripping test is specified in IEC 947-2, during which the circuit breaker must trip within a limited time when a fault current of a defined magnitude occurs.

Simultaneous satisfaction of both tests and additional satisfaction of the surge-current test, which is likewise required, and in which no-trip is required in response to very brief (for example, 8 $\mu$s rise time and 20 $\mu$s fall time to half the peak value) fault currents whose amplitude is nevertheless very high (for example 250 A), demands a specific solution, particularly when the aim is to achieve a time delay which is as constant as possible, irrespective of the type of fault current, with designs which are sensitive to pulsed current or all currents and have to satisfy various tripping requirements for different tripping fault currents.

A circuit breaker according to the precharacterizing clause of claim 1 is known from PATENT ABSTRACTS OF JAPAN vol. 018, No. 434 (E-1592), Aug. 12, 1994 (1994-08-12) and, JP 06 133448 A (MATSUSHITA ELECTRIC WORKS LTD), May 13, 1994 (1994-05-13). The application there is ground-fault detection.

The invention is thus based on the object of specifying a delay circuit for a residual-current circuit breaker having a variable tripping time delay, which delay circuit has a high withstand current and a tripping time delay which is as constant as possible and is independent of the type of fault current.

According to the invention, this object is achieved by the features of claim 1. According to this, the delay circuit comprises a smoothing module which passes on an input voltage, derived from a fault current, in smoothed form to two series-connected comparators, between which a time delay module with a variable delay time is located.

The two comparators and the time delay module connected between them mean that any fault current which occurs does not lead to the circuit breaker tripping unless the associated input voltage exceeds a predetermined switch-on level at least for a time period corresponding to the delay time set. The smoothing module prevents the tripping time delay from being considerably lengthened by the comparator switching threshold being continually overshot and undershot as a result of the signal ripple, which is dependent on the type of fault current, in the case of fault currents with a high signal ripple level, for example in the case of phase-gated fault currents, and thus prevents the tripping time delay from acting in a different way as a function of the type of fault current.

There is preferably a surge-current filter upstream of the first comparator. This prevents short-term surge currents with a low repetition rate from causing the circuit breaker to trip inadvertently when the delay time set is short.

The smoothing module is expediently in the form of a diode with a downstream low-pass filter in the form of an R-C element, whose capacitor is discharged via a first discharge circuit provided with a non-reactive resistor. This makes it possible to preset the charging time constant and the discharge time constant of the low-pass filter independently of one another. This in turn allows a desired smoothing level to be set particularly precisely. In this case, it has been found to be particularly advantageous for the discharge time constant to be selected to be longer than the charging time constant for example by a factor of between 5 and 15.

In order to prevent the first low-pass filter from unnecessarily lengthening the integration time constant (which is required to satisfy the no-trip test) of the time-delay module owing to its discharge time, and thus making it more difficult or impossible to satisfy the tripping time limit values required in this case, a zener diode is connected in parallel with the first discharge circuit. The maximum voltage applied to the capacitor is limited by this zener diode, so that said capacitor in turn discharges quickly. The breakdown voltage of the zener diode is advantageously only slightly greater than the switch-on level of the first comparator. This effectively prevents the capacitor from being overcharged above the value required to trip the switching process of the first comparator.

This shortens the time period during which the capacitor voltage is below the reference voltage once again after interruption of the fault current.

The conventional circuitry of the first comparator, with two non-reactive resistors, advantageously provides the first comparator with switching hysteresis. Switching hysteresis provides two threshold voltages, rather than a single threshold voltage, as the switch-on level and switch-off level. In this case, the comparator is switched on when the higher threshold voltage, which is used as the switch-on level, is exceeded. The process of switching off the comparator occurs only when the lower threshold voltage, which is provided as the switch-off level, is undershot. This prevents the signal ripple on the input voltage leading to the comparator switching on and off repeatedly when the input voltage is close to the switch-on level. The switching hysteresis, and thus the difference between the switch-on level and the switch-off level, are expediently matched to the parameters of the smoothing module. In this case, the switching hysteresis is preset at a lower level, the greater the smoothing level. Experiments have shown a switching hysteresis of $\leq 100$ mV to be particularly advantageous.

The time-delay module is implemented, in a simple manner, in the form of a second capacitive low-pass filter. In this case, the capacitance is varied in order to set the delay time. In one particularly advantageous embodiment, a number of capacitors with different capacitances are provided for this purpose, of which in each case one or—as an equivalent to a capacitor having zero capacitance-none is connected as the capacitance in the low-pass filter. In this way, the delay time can be varied with a number of steps.

The surge-current filter is preferably in the form of a third low-pass filter, which is decoupled by a diode and is in the form of an R-C element with a second discharge circuit. In this case, the discharge time constant is advantageously more than 50 times the charging time constant. Owing to the comparatively long discharge time, the surge-current filter acts only on brief surge currents with a low repetition rate. The zener diode connected in parallel with the first discharge circuit at the same time provides voltage limiting for the second discharge circuit.

The advantages achieved by the invention are, in particular, that, by means of a delay circuit having two series-connected comparators between which a time-delay module is located, and having a smoothing module upstream of the first comparator, the circuit breaker has a no-trip response, irrespective of the type of fault current, to brief fault currents.

The preferred interconnection of three low-pass filters whose charging time constant and discharge time constant ratios differ on the one hand effectively prevents the tripping of the circuit breaker under the influence of a brief surge fault current, irrespective of the delay time set. On the other hand, when a fault current which is present all the time occurs, it allows a tripping time which is not unnecessarily long, and thus tripping-time limiting in compliance with the regulations.

Figure 2:
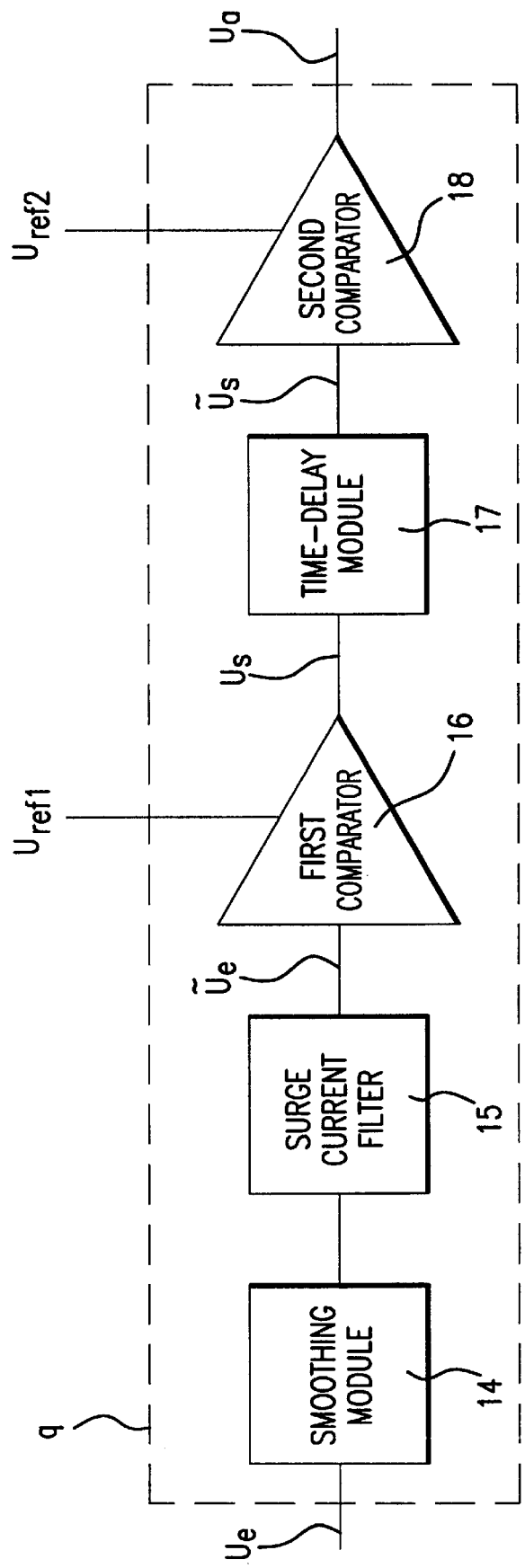
Figure 3:
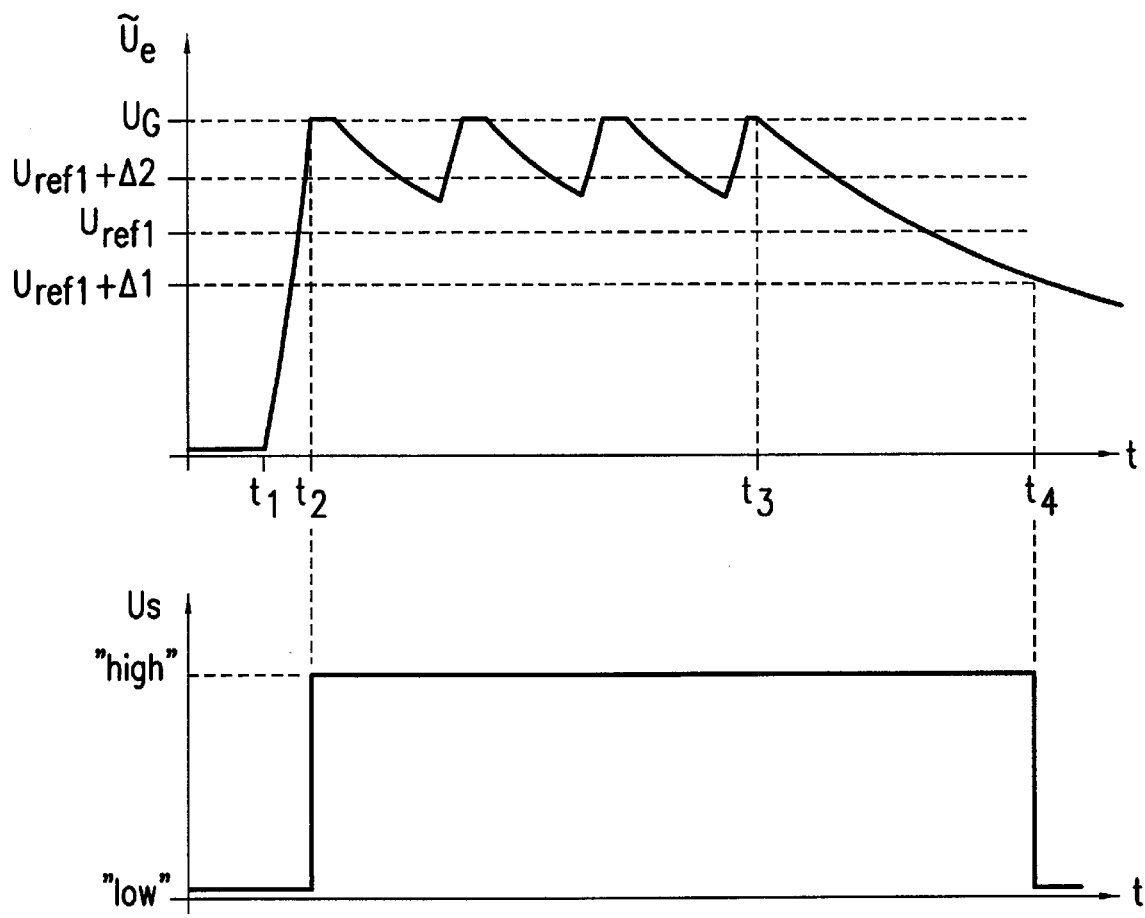
Figure 4:
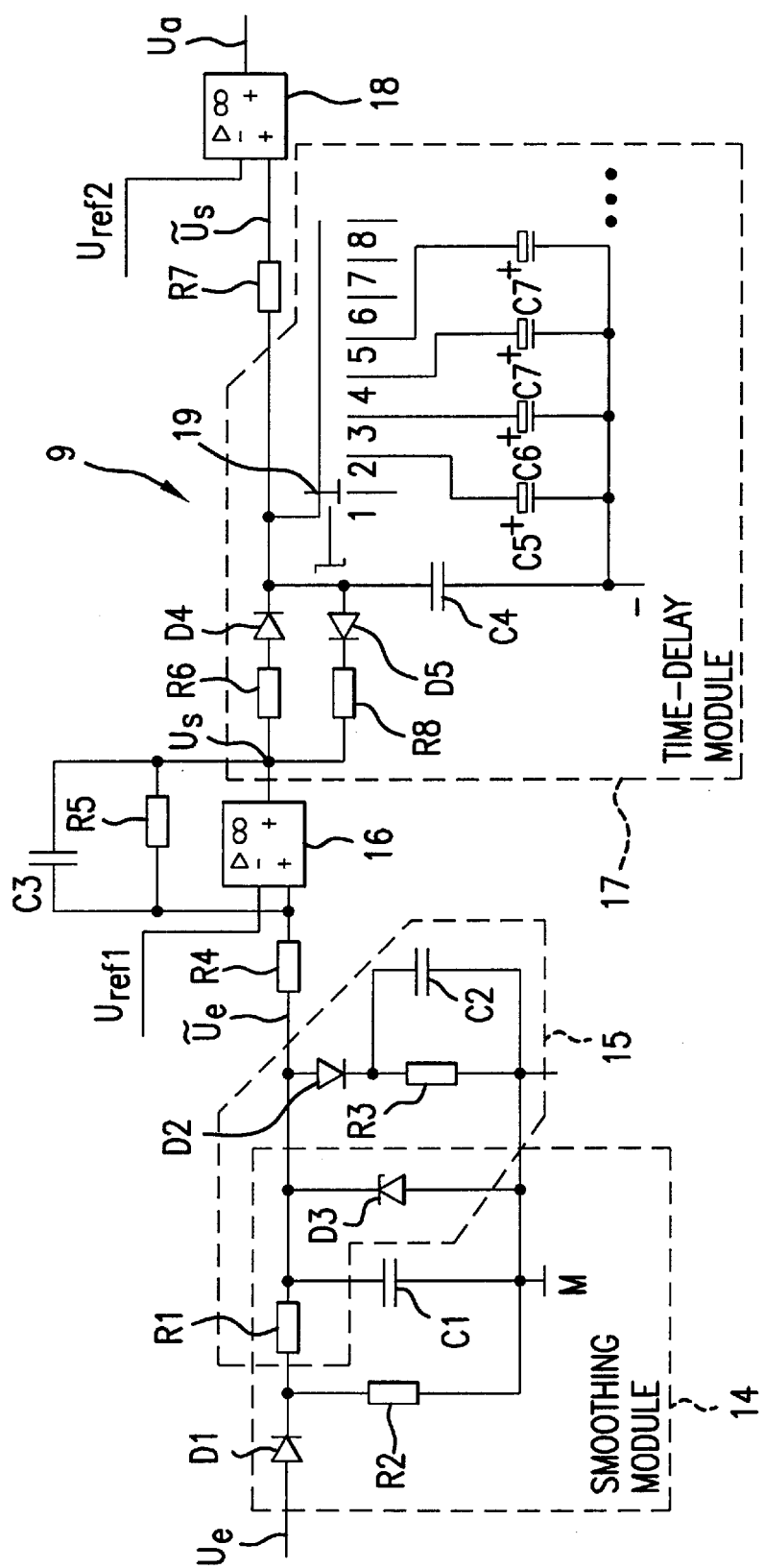

Tripping-time limiting is ensured by an optimized setting of the smoothing level in the smoothing module, in conjunction with large first comparator switching hysteresis, matched to this. In this case, the tripping time is largely independent of the type of fault current. In particular, the tripping time in response to phase-gated fault currents is not significantly longer than that in response to sinusoidal fault currents. An exemplary embodiment of the invention will be explained in more detail in the following text with reference to a drawing, in which:

FIG. 1 shows, schematically, a residual-current circuit breaker, with a delay circuit, FIG. 2 uses a block diagram to show the tripping control according to FIG. 1, FIG. 3 uses a voltage/time graph to show the method of operation of a "first" comparator for tripping control according to FIG. 2, and FIG. 4 shows an electronic circuit diagram of the delay circuit according to FIG. 2.

The residual-current circuit breaker illustrated in FIG. 1 comprises a core-balance transformer 1 with a transformer core 2 through which the three phase lines L1, L2, L3 and the neutral conductor N of a four-conductor power supply system (from now on referred to as Ln) are passed. The circuit breaker is in this case upstream of a (not illustrated) electrical load, which is supplied with current from the four-conductor power supply system Ln in the feed direction Er.

The transformer core 2 furthermore has a secondary coil 3 wound around it. When the four-conductor power supply system (L1 to L3, N) is operating correctly, the sum of the currents flowing through the transformer core 2 is always zero. A disturbance occurs when—for example as a result of a leakage current—a portion of the current that is supplied is carried to ground on the load side. In this case, the sum of the currents flowing through the transformer core 2 has a magnitude other than zero. This residual current or fault current induces a difference voltage $U_A$ in the secondary coil 3 of the core-balance transformer 1, and this difference voltage $U_A$ is used as a measure of the fault current that has occurred. The difference voltage $U_A$ produced in the secondary coil 3 in this case first of all passes through an amplifier 4 and a rectifier 5 in a tripping circuit 6. In order to operate the amplifier 4, a residual-current circuit breaker—in contrast to a fault-current circuit breaker—is supplied with current via a power supply unit 7. To this end, the power supply unit 7 is often connected to the four-conductor power supply system Ln on the load side via a supply line 8.

After amplification and rectification, the difference voltage $U_A$ is supplied as an input voltage $U_e$ to a delay circuit 9. If the magnitude and duration of the input voltage $U_e$ exceed a threshold value, then the delay circuit 9 emits a tripping voltage $U_a$ to the actuating circuit 10 of a release 11. The release 11, which is preferably in the form of a relay coil, operates a mechanical switching mechanism 12, which opens the contacts of a power breaker 13 which acts on all the lines L1 to L3, N of the four-conductor power supply system Ln. The tripping voltage $U'_a$ of the actuating circuit 10 is in this case carried to ground M via the release 11.

The delay circuit 9 is illustrated as a block diagram in FIG. 2. In the delay circuit 9, the input voltage $U_e$, which is supplied as a pulsed DC voltage, first of all passes through a smoothing module 14. This reduces the ripple on the input voltage $U_e$, that is to say the AC voltage element with respect to the DC voltage element. A modified input voltage $\tilde{U}_e$ is thereby produced, with a comparatively smooth waveform.

Individual surge currents, which recur on rare occasions, such as those which are produced by a lightning surge voltage, are suppressed by means of a surge-current filter 15 downstream of the smoothing module 14. The smoothed input voltage $\tilde{U}_e$, from which surge currents with a low repetition rate have been removed, is supplied on the input side to a first comparator 16. If the input voltage $\tilde{U}_e$ exceeds a switch-on threshold, which is predetermined by a first comparator 16 by means of a reference voltage $U_{ref1}$, then the first comparator 16 emits a signal voltage $U_s$, which is not zero and is classified in the following text as "high". A modified signal voltage $\tilde{U}_s$ is supplied to a second comparator 18 via a time-delay module 17. However, owing to the time-delay module 17, this modified signal voltage $\tilde{U}_s$ is not immediately available with its maximum magnitude "high" at the input of the second comparator 18. Instead of this, the time-delay module 17 causes the signal voltage $\tilde{U}_s$ to rise gradually, so that a reference voltage $U_{ref2}$, which is preset as the switch-on level of the second comparator is reached only after a predetermined delay time. The switch-on level $U_{ref2}$, of the second comparator 18 is thus exceeded only when the switch-on level $U_{ref1}$, of the first comparator 16 has been exceeded by the input voltage $\tilde{U}_e$ for the total time period of the delay time. When the switch-on level $U_{ref2}$ of the second comparator 18 is exceeded, it emits an output voltage $U_a$ whose magnitude is "high" to the actuating circuit 10.

If, on the other hand, the switch-off level of the first comparator 16 is undershot within the delay time, then it switches the signal voltage $U_s$ back to the comparatively low level "low". This leads to the signal voltage $\tilde{U}_s$ at the input of the second comparator 18 decreasing at a rate slowed by the time-delay module 17. The switching process of the second comparator 18, which is associated with the tripping of the circuit breaker, is thus prevented.

In order to ensure a stable switching process, the first comparator 16 has switching hysteresis Δ. The method of operation of such a comparator with switching hysteresis within the delay circuit 9 is outlined in FIG. 3. In contrast to the situation with a comparator having no switching hysteresis, in which the switch-on level and the switch-off level have the same magnitude, the switch-off level $U_{ref1}-\Delta 1$ of the first comparator 16 is reduced from its reference voltage $U_{ref1}$ by the voltage Δ1. If, owing to a fault current that starts at the time $t_1$, the rising input voltage $\tilde{U}_e$ exceeds the switch-on level $U_{ref1+\Delta}2$ for the first time at the time $t_2$, then the comparator 16 switches the output voltage $U_s$ from "low" to "high". The rate of rise of $\tilde{U}_e$ depends on the charging time constant of the smoothing module 14 and of the surge-current filter 15. Further undershooting or overshooting of the switch-on level $U_{ref1}+\Delta 2$ by the ripple on the input voltage $\tilde{U}_e$ do not lead to any further switching processes. $\tilde{U}_e$ is limited to a limit voltage $U_G$ by a voltage limiter contained in the smoothing module. If the fault current ceases at the time $t_3$, then $\tilde{U}_e$ decreases again. The time to reach the switch-off level $U_{ref1}-\Delta 1$ is governed by the discharge constant of the smoothing module 14 and, if appropriate and if $\tilde{U}_e$ is sufficiently large, by the level of the limit voltage $U_G$. The signal voltage $U_s$ is not switched back from "high" to "low" until the input voltage $\tilde{U}_e$ falls below the switch-off level $U_{ref1}-\Delta 1$, at the time $t_4$.

FIG. 3 shows that the integration time constant required in the time-delay module 17 for the no-trip test is dependent not only on the specified duration of the no-trip fault current, but also on the discharge time constant of the smoothing module 14 and on the magnitude of the limit voltage $U_G$. The shorter the discharge time constant and the limit voltage $U_G$, the lower is the integration time constant required in the time-delay module 17 for the no-trip test. This assists compliance with the tripping-time limit values for the tripping test, which is likewise a requirement.

FIG. 4 shows a preferred embodiment of the delay circuit 9 in an electronic circuit diagram. The smoothing module 14 according to this figure is in the form of a diode D1 with a downstream first low-pass filter R1, C1. Its capacitor C1 is charged via a charging resistor R1 by the applied input voltage $U_e$. If the input voltage $U_e$ falls, C1 is discharged via the resistors R1+R2. The voltage $\tilde{U}_e$ which is present across the capacitor C1 is applied via a resistor R4 to the input of the first comparator 16. In circuitry terms, the comparator 16 is provided with switching hysteresis Δ=Δ1+Δ2 by means of the resistor R4 and a resistor R5, which connects the input of the comparator 16 to its output. A capacitor C3 is connected in parallel with the resistor R5 in this case, in order to improve the interference immunity. The predetermined reference voltage $U_{ref1}$, is applied to the reference input of the first comparator 16.

If the voltage $\tilde{U}_e$ exceeds the switch-on level $U_{ref1}+\Delta 2$ of the first comparator 16, its output voltage $\tilde{U}_s$ then changes from "low" to "high". This is supplied to the time-delay module 17, which is in the form of a second low-pass filter R6, Cx. In this context, Cx represents a number of capacitors C5, C6, C7, C8 which can be connected alternatively as capacitance for the second low-pass filter R6, Cx, by means of a switch 19. Cx furthermore denotes the possibility of none of the capacitors C5, C6, C7, C8 being connected. This switch position, which is shown in FIG. 4, formally corresponds to the connection of a capacitor whose capacitance is zero. In a corresponding manner, the delay circuit 9 in this case operates with zero delay time. For electromagnetic compatibility (EMC) reasons, a capacitor C4, whose capacitance is negligible in comparison to the capacitors C5, C6, C7, C8, is connected in parallel with said capacitors C5, C6, C7, C8. The resistor R6 is used as a charging resistor for Cx. A resistor R8 connected in parallel with the resistor R6 is furthermore used as a discharge resistor. The resistors R6 and R8 are decoupled via the diodes D4 and D5. Configuring the charging resistor R6 and the discharge resistor R8 as separate components makes it possible to set the reset time of the time-delay module 17 to the original state (Cx discharged) after the fault current has been interrupted, irrespective of all the other requirements.

If one of the capacitors C5, C6, C7, C8 is connected, then the capacitor Cx which is connected will be charged up first of all via a resistor R6 and the diode D4 as a consequence of the process in which the first comparator 16 is switched on. The voltage, which rises across the connected capacitor Cx as a consequence of this charging process, is applied via a resistor R7 to the input of the second comparator 18. If this voltage exceeds the switch-on level of the second comparator 18, then the second comparator 18 changes the output voltage $U_a$ from "low" to "high". The switch-on level of the second capacitor 18 is dependent on the reference voltage $U_{ref2}$ applied to its input. This switching on of the output voltage $U_a$ then leads to operation of the release 8.

The charging time constant R1×C1 of the first low-pass filter R1, C1 is limited to R1×C1 <10 ms in order to achieve a short tripping time—particularly for the setting without any delay or for a very short time-delay setting. The higher the resistance of the discharge resistor (R2+R1) in the first low-pass filter R1, C1, the smaller is the amount of ripple on the voltage on the input of the first comparator 16. At the same time, an excessively large discharge resistor (R1+R2) in some circumstances increases the tripping time of the circuit breaker up to an unacceptable extent. Specifically, if the capacitor C1 is charged as a result of a fault current for a limited time, then the voltage $\tilde{U}_e$ falls only slowly with the discharge time constant (R1+R2)×C1. If the decay of $\tilde{U}_e$ after the cessation of the fault current to reaching the comparator switch-off threshold is too long, it will no longer be possible to satisfy the contradictory requirements of the tripping test and no-trip test. This is particularly true if a short time delay is set. For this reason, the magnitude of the discharge resistor (R1+R2) is only five to fifteen times that of the charging resistor R1. A corresponding situation applies to the time constants which result from the product of the capacitance C1 and the appropriate resistor, that is to say the relationship $5<[(R1+R2)\times C1]/[R1\times C1]<15$. Any ripple remaining on the input voltage $\tilde{U}_e$ is in this case negligible. The first comparator 16 is prevented from being switched on and off repetitively as a result of this ripple by means of hysteresis $\Delta>100$ mV of adequate size, matched to the smoothing module. The hysteresis $\Delta$ is set in a known manner by appropriate dimensioning of the resistors R4 and R5.

As a further means to shorten the discharge time of the capacitor C1, a zener diode D3 is connected in parallel with it. This limits the maximum voltage applied to the capacitor C1 to a valve $U_G$ which is immediately above the switch-on level $U_{ref1}+\Delta 1$ of the first comparator 16.

The surge-current filter 15, which is provided in order to damp surge currents with a low repetition rate, is in the form of a third low-pass filter R1, C2. Its capacitor C2 is in this case charged via the charging resistor R1 and the diode D2. The discharge time constant R3×C2 is in this case approximately 50 times the charging time constant R1×C2. Owing to the comparatively long discharge time constant R3×C2, the surge-current filter 15 comes into action only in response to short-term discharge currents, which recur only rarely.

What is claimed is:

1. A circuit breaker having a delay circuit, comprising:
   a smoothing module for smoothing an input voltage which indicates a fault current;
   a first comparator which is downstream of the smoothing module and outputs an internal signal voltage;
   a second comparator to output a tripping voltage which is delayed with respect to the signal voltage, with a time-delay module connected between the comparators, wherein the smoothing module has a first low-pass filter, and the time-delay module has a second low-pass filter; and
   a surge-current filter with a third low-pass filter upstream of the first comparator having the time-delay module with a variable delay time, wherein the third low-pass filter is decoupled by a diode and comprises a discharge circuit.

2. The circuit breaker as claimed in claim 1, wherein the smoothing module comprises a first low-pass filter with a first discharge circuit in parallel with which a zener diode is connected as a voltage limiter.

3. The circuit breaker as claimed in claim 2, wherein the breakdown voltage of the zener diode corresponds approximately to a switch-on level of the first comparator.

4. The circuit breaker as claimed in claim 1, wherein a ratio of a charging time constant to a discharge time constant of the first low-pass filter is $5<[(R1+R2)\times C1]/[R1\times C1]<15$.

5. The circuit breaker as claimed in claim 1, wherein the first comparator has switching hysteresis $\Delta>100$ mV.

6. The circuit breaker as claimed in claim 1, wherein the second low-pass filter comprises a variable capacitance.

7. The circuit breaker as claimed in claim 4, wherein in order to adjust the capacitance, a number of capacitors of different capacitance are connected as an alternative to the second low-pass filter.

8. The circuit breaker as claimed in 6, wherein a ratio of a discharge third low-pass filter is $(R3\times C2)/(R1\times C2)>50$.

9. The circuit breaker as claimed in claim 1, wherein a zener diode is connected in parallel with the second discharge circuit as a voltage limiter.

10. The circuit breaker as claimed in claim 1, wherein a discharge time constant of the-delay module is adjusted by a discharge resistor, independently of a charging time constant.

* * * * *